(12) United States Patent
Yu et al.

(10) Patent No.: US 12,221,555 B2
(45) Date of Patent: Feb. 11, 2025

(54) COMPOSITION FOR COATING THE EDGE OF AN OPTICAL LENS

(71) Applicant: Essilor International, Charenton-le-Pont (FR)

(72) Inventors: Hui Yu, Singapore (SG); Sunil Madhukar Bhangale, Singapore (SG); Prakhar Kasture, Singapore (SG); Pierre Fromentin, Bangkok (TH)

(73) Assignee: Essilor International, Charenton-le-Pont (FR)

( * ) Notice: Subject to any disclaimer, the term of this patent is extended or adjusted under 35 U.S.C. 154(b) by 747 days.

(21) Appl. No.: 17/292,797

(22) PCT Filed: Nov. 13, 2019

(86) PCT No.: PCT/EP2019/081247
§ 371 (c)(1),
(2) Date: May 11, 2021

(87) PCT Pub. No.: WO2020/099522
PCT Pub. Date: May 22, 2020

(65) Prior Publication Data
US 2021/0395561 A1    Dec. 23, 2021

Related U.S. Application Data

(63) Continuation-in-part of application No. PCT/IB2018/001452, filed on Nov. 14, 2018.

(51) Int. Cl.
| | | |
|---|---|---|
| C09D 163/00 | (2006.01) |
| C08G 59/14 | (2006.01) |
| C08G 59/24 | (2006.01) |
| C08G 59/64 | (2006.01) |
| C08G 59/68 | (2006.01) |
| C09D 7/20 | (2018.01) |
| G02B 1/04 | (2006.01) |
| G02B 1/10 | (2015.01) |
| G02B 5/00 | (2006.01) |

(52) U.S. Cl.
CPC ....... *C09D 163/00* (2013.01); *C08G 59/1477* (2013.01); *C08G 59/245* (2013.01); *C08G 59/64* (2013.01); *C08G 59/686* (2013.01); *C09D 7/20* (2018.01); *G02B 1/04* (2013.01); *G02B 1/10* (2013.01); *G02B 5/003* (2013.01)

(58) Field of Classification Search
CPC ... C08G 59/64; C08G 59/245; C08G 59/1477
See application file for complete search history.

(56) References Cited

U.S. PATENT DOCUMENTS

| | | | |
|---|---|---|---|
| 8,083,349 B2 | 12/2011 | Ho et al. | |
| 2003/0148098 A1* | 8/2003 | Shafi | C09D 171/00 428/375 |

FOREIGN PATENT DOCUMENTS

| | | |
|---|---|---|
| EP | 1328833 | 7/2003 |
| WO | WO1999/038924 | 8/1999 |

OTHER PUBLICATIONS

International Search Report from the Patent Cooperation Treaty issued in International Application No. PCT/EP2019/081247 mailed Jan. 28, 2020.

* cited by examiner

*Primary Examiner* — Wenwen Cai
(74) *Attorney, Agent, or Firm* — Norton Rose Fulbright US LLP

(57) ABSTRACT

The present invention relates to a cross-linkable composition comprising an epoxy oligomer comprising at least six hydroxy groups, to a coating obtained by curing the cross-linkable composition and to an optical lens comprising said coating on a surface thereof, in particular on the edge surface thereof. The invention also relates to a method of preparing a coating for an optical lens and to a method of coating a surface of an optical lens, in particular the edge surface of an optical lens.

18 Claims, 4 Drawing Sheets

COMPOSITION FOR COATING THE EDGE OF AN OPTICAL LENS

CROSS-REFERENCE TO RELATED APPLICATIONS

This application is a national phase application under 35 U.S.C. § 371 of International Application No. PCT/EP2019/081247 filed 13 Nov. 2019, which is a continuation-in-part of International Application No. PCT/IB2018/001452 filed 14 Nov. 2018. The entire contents of each of the above-referenced disclosures is specifically incorporated by reference herein without disclaimer.

TECHNICAL FIELD

The present invention relates to a cross-linkable composition comprising an epoxy oligomer comprising at least six hydroxy groups, to a coating obtained by curing the cross-linkable composition and to an optical lens comprising said coating on a surface thereof, in particular on the edge surface thereof. The invention also relates to a method of preparing a coating for an optical lens and to a method of coating a surface of an optical lens, in particular the edge surface of an optical lens.

BACKGROUND

A coating may be introduced on the edge of an optical lens as an edge coating for various reasons. For example, an opaque coating may be deposited on the edge of an optical lens to reduce visibility of myopia rings and white rings for aesthetic purposes. Examples of a myopia ring and a white ring are shown in FIG. 1A and FIG. 1B as 110 and 112, respectively. For effective reduction in visibility of the myopia rings and white rings, the edge coating should have good opacity, finishing, mechanical, and adhesion properties to allow masking of the myopia rings and white rings.

To this end, an operator may apply the coating on the edge of an optical lens using a marker pen or a brush, or by spray coating. Ideally, the coating is applied onto the edge surface of the optical lens only, without any of the coating being coated on the optical surfaces of the optical lens.

For illustration purposes, FIG. 2A is a schematic diagram showing an edge coating 202 disposed on an edge surface of an optical lens 200. The edge surface of the optical lens 200 is defined by the surface between the first optical surface 220 and the second optical surface 222. The edge surface of the optical lens 200 comprises a lens bevel 226 and a safety bevel 224. As depicted in the figure, there is no overflow on the first optical surface 220 and the second optical surface 222 of the optical lens 200.

Notwithstanding the above, the operator often finds himself or herself in a situation whereby he or she accidentally introduces some excess coating, otherwise termed herein as overflow, on the optical surfaces. This is depicted in FIG. 2B, which is a schematic diagram showing an edge coating 202 disposed on an edge surface of an optical lens 200. As shown in the figure, there is overflow in the form of excess coating 204, 206 disposed respectively on the first optical surface 220 and the second optical surface 222 of the optical lens 200. These overflows have to be removed completely so as not to compromise aesthetics of the optical lens. In embodiments wherein an optical lens edge comprises multiple facets, for example, it is very difficult to ensure complete coating coverage on each and every facet, while not introducing overflows on the optical surfaces.

Accordingly, apart from the good opacity, finishing, mechanical, and adhesion properties mentioned above, it is also important that the coating allows ease of removal in the event of overflow. Furthermore, the coating should cure in short spans of time, such as within 3 hours, so as to allow mounting of lenses as soon as possible after applying the coating. Additionally, the coating should be suited for use on a diversity of substrates, in particular substrates having a high refractive index, more particularly polycarbonate, and polythiourethanes such as MR-7® and MR-8®.

In light of the above, there remains a need for improved coatings which are able to provide a consistent and complete coating coverage on the edge surface of an optical lens, and which address or at least alleviate one or more of the above-mentioned problems.

SUMMARY

A first object of the present invention is a cross-linkable composition comprising an epoxy oligomer of formula (I):

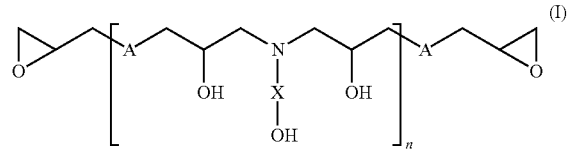

wherein A, X and n are as defined herein.

A second object of the present invention is a coating obtained by curing the cross-linkable composition of the invention.

A third object of the present invention is a coating comprising a cross-linked network of epoxy oligomer of formula (I) and optionally an opacifying agent dispersed within said cross-linked network.

Another object of the present invention is an optical lens comprising a front optical surface, a back optical surface and an edge surface between the front optical surface and the back optical surface, wherein at least one surface of the optical lens is coated with the coating of the invention.

Yet another object of the present invention is a method of preparing a coating for an optical lens, said method comprising:
a) providing a solution comprising the epoxy oligomer of formula (I) in a solvent;
b) adding an opacifying agent, a cross-linking agent, and a catalyst to the solution, wherein the cross-linking agent is added after the opacifying agent is added to the solution; and
c) cross-linking the epoxy oligomer with the cross-linking agent to form a cross-linked network, wherein the opacifying agent is dispersed in the cross-linked network.

A final object of the present invention is a method of coating a surface of an optical lens, said method comprising
a) applying the cross-linkable composition of the invention to a surface of an optical lens, preferably an edge surface of an optical lens; and
b) curing the cross-linkable composition.

DETAILED DESCRIPTION

Cross-Linkable Composition

Figure 1A:
FIG. 1A is a photograph of the front view of a user wearing an eyeglass (100). A white ring (112) is shown.
Figure 1B:
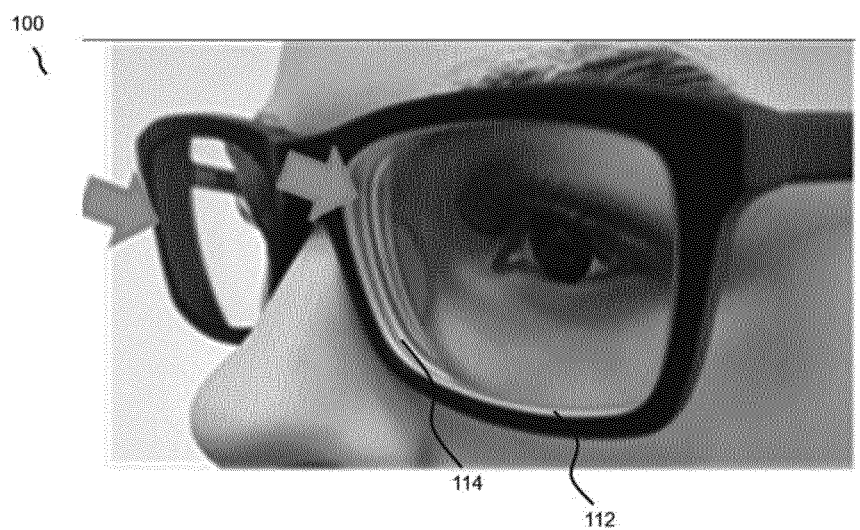
FIG. 1B is a photograph of the side view of a user wearing an eyeglass (100). A white ring (112) and a myopia ring (114) is shown.

The cross-linkable composition of the invention comprises an epoxy oligomer having 2 epoxide groups and at least 6 hydroxy groups (—OH).

The epoxy oligomer of the invention is represented by formula (I):

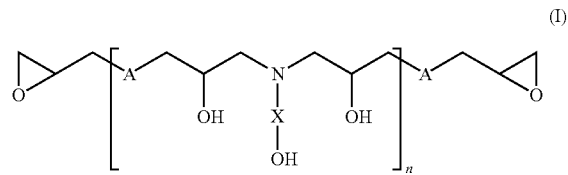

wherein
A is a residue of a diol, preferably a residue of a diol comprising an aromatic moiety, more preferably a residue of a diol comprising a bisphenol moiety;
X is a substituted or unsubstituted hydrocarbylene, preferably a substituted or unsubstituted $C_1$-$C_{10}$ hydrocarbylene, more preferably an unsubstituted $C_1$-$C_{10}$ hydrocarbylene;
n is 2, 3, 4, 5 or 6, preferably n is 2 or 3, more preferably n is 2.

The term "residue of a diol" is intended to mean a divalent radical obtained by removing the hydrogen atom of each hydroxy group of a diol.

The term "hydrocarbylene" is intended to mean a divalent radical obtained by removing two hydrogen atoms from a hydrocarbon. The term "hydrocarbon" is intended to mean a cyclic or acyclic compound consisting of carbon and hydrogen atoms. The term "substituted hydrocarbylene" is intended to mean a hydrocarbylene that is substituted with one two or three substituents selected from OH, SH, halogen and a $C_1$-$C_{10}$ alkyl group substituted with OH or SH. The term "$C_1$-$C_{10}$ hydrocarbylene" is intended to mean a hydrocarbylene comprising 1 to 10 carbon atoms.

In one embodiment, residue A of the epoxy oligomer of formula (I) may be represented by formula (II) or (III)

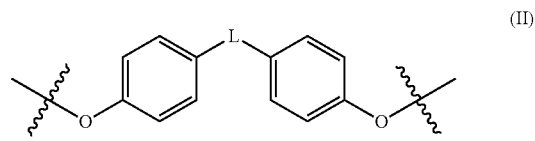

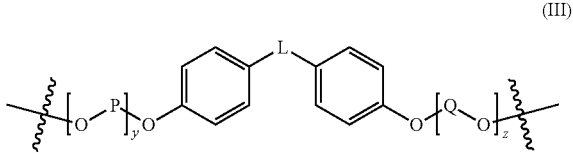

wherein L is a direct bond, —$CR^1R^2$—, —O—, —$NR^3$—, —$S(O)_{0-2}$—, —C(O)—, or L is selected from

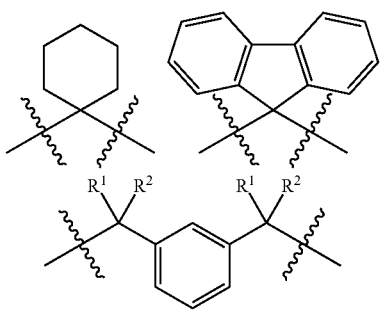

-continued

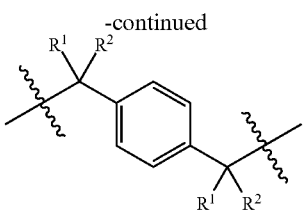

P and Q are each independently ethylene or propylene;
$R^1$ and $R^2$ are each independently H, halogen, $C_1$-$C_{10}$ alkyl, $C_1$-$C_{10}$ haloalkyl, aryl, aralkyl or —$NR^3R^4$;
$R^3$ and $R^4$ are each independently H or $C_1$-$C_{10}$ alkyl
y and z are each independently an integer of 1 to 40.

In a preferred embodiment of the invention, residue A of the epoxy oligomer of formula (I) may be represented by formula (II) wherein L, $R^1$ and $R^2$ are as defined above.

The term "halogen" is intended to mean an atom selected from Cl, Br, I and F.

The term "$C_1$-$C_{10}$ alkyl" is intended to mean a monovalent radical of a linear or branched hydrocarbon chain comprising 1 to 10 carbon atoms.

The term "$C_1$-$C_{10}$ haloalkyl" is intended to mean a $C_1$-$C_{10}$ alkyl group substituted by one or more halogen atoms.

The term "aryl" is intended to mean a monovalent radical of an aromatic hydrocarbon comprising 6 to 18 carbon atoms.

The term "aralkyl" is intended to mean a $C_1$-$C_{10}$ alkyl group substituted by an aryl.

In a particularly preferred embodiment of the invention, residue A of the epoxy oligomer of formula (I) may be represented by formula (IIa) wherein $R^1$ and $R^2$ are each independently H, halogen, $C_1$-$C_{10}$ alkyl, preferably $R^1$ and $R^2$ are methyl.

In one embodiment, hydrocarbylene X of the epoxy oligomer of formula (I) may be a substituted or unsubstituted alkylene, preferably a substituted or unsubstituted $C_1$-$C_{10}$ alkylene; more preferably an unsubstituted $C_1$-$C_{10}$ alkylene, even more preferably X is —$(CH_2)_2$—.

The term "alkylene" is intended to mean a divalent radical obtained by removing two hydrogen atoms from an alkane. The term "alkane" is intended to mean an acyclic saturated hydrocarbon that may be linear or branched. The term "$C_1$-$C_{10}$ alkylene" is intended to mean an alkylene comprising 1 to 10 carbon atoms. The term "substituted alkylene" is intended to mean an alkylene substituted by one, two or three substituents selected from OH, SH halogen and a $C_1$-$C_{10}$ alkyl group substituted with OH or SH.

The molecular weight of the epoxy oligomer of formula (I) may be adjusted to provide a composition having a viscosity that is suitable for coating an optical lens. In one embodiment, the molecular weight of the epoxy oligomer of formula (I) is from 500 to 5,000 g/mol, preferably 800 to 4,000 g/mol, more preferably 1,000 to 2,600 g/mol.

In a particularly preferred embodiment, the epoxy oligomer of formula (I) is represented by formula (Ia):

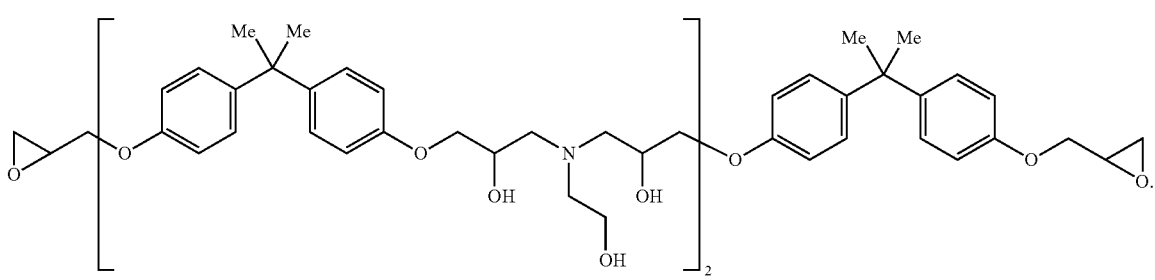

(Ia)

In a particularly preferred embodiment of the invention, residue A of the epoxy oligomer of formula (I) may be represented by formula (IIa) or (IIIa):

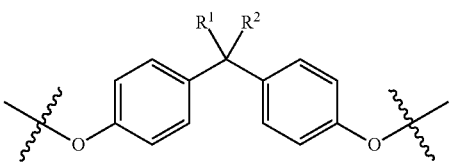

(IIa)

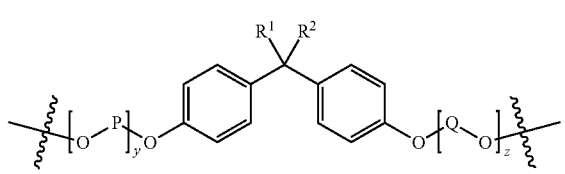

(IIIa)

wherein $R^1$ and $R^2$ are each independently H, halogen, $C_1$-$C_{10}$ alkyl, preferably $R^1$ and $R^2$ are methyl.

The cross-linkable composition of the invention may further comprise an opacifying agent.

The term "opacifying agent" is intended to mean a compound that imparts opacity to the cross-linkable composition of the invention and/or to the coating obtained by curing said cross-linkable composition. The term "opacity" is intended to mean the ability to reduce the transparency of a material or the light transmittance through a material. An opacifying agent may absorb more than 90% of the visible light, comprising wavelengths from about 380 to 780 nm.

The cross-linkable composition of the invention is therefore particularly well suited to provide an edge coating on an optical lens, thereby camouflaging or disguising the myopia rings or white rings.

The opacifying agent may have a colour that is user specified. For example, the colour of the opacifying agent may be chosen to provide an edge coating having the same colour as or complementing with the colour of an eyewear frame with which the optical lens is fitted. The colour of the opacifying agent may alternatively be chosen to provide a coating having a colour that contrasts with the colour of the eyewear frame, thereby giving the wearer an additional fashion choice while providing the benefits of reducing the appearance of the myopia ring or white ring appearing along the perimeter of the optical lens face.

In one embodiment, the opacifying agent may be an organic or inorganic pigment, preferably an organic or inorganic black pigment or a black material, more preferably carbon black or ferric oxide.

In one embodiment, the opacifying agent may be dispersed, in particular substantially homogeneously dispersed, in the epoxy oligomer of formula (I) or in a cross-linked network of the epoxy oligomer of formula (I).

The amount of opacifying agent in the cross-linkable composition may be adjusted according to the amount of epoxy oligomer of formula (I). In one embodiment, the weight ratio of the epoxy oligomer of formula (I) to the opacifying agent is in the range of about 1:0.1 to about 1:3, in particular about 1:0.5 to about 1:2.5, more particularly 1:1 to 1:2.

The cross-linkable composition of the invention may further comprise a solvent or a mixture of solvents. As used herein, the term "solvent" refers to a liquid capable of solubilizing the epoxy oligomer of formula (I) and optionally part of the other constituents of the composition. In one embodiment, the cross-linkable composition may comprise a solvent having a quick evaporation rate and a solvent having a slow evaporation rate.

As used herein the term "evaporation rate of a solvent" is intended to mean the rate at which a solvent will vaporize compared to the rate of vaporization of n-butyl acetate. This quantity is a ratio, therefore it is unitless. The relative evaporation rate of butyl acetate is arbitrarily fixed to 1.0. A solvent having an evaporation rate higher than 3 is considered to have a fast evaporation rate. A solvent having an evaporation rate lower than 0.8 is considered to have a slow evaporation rate.

In one embodiment, the solvent may be selected from THF, propylene glycol monomethyl ether acetate, 1-methoxy-2-propanol acetate, acetone, xylene and mixtures thereof, preferably the solvent may be a mixture of THF and propylene glycol monomethyl ether acetate.

The cross-linkable composition of the invention may further comprise a cross-linking agent having at least two isocyanate groups. The cross-linking agent forms a cross-linked network of epoxy oligomer of formula (I) by reacting with the hydroxy groups of said epoxy oligomer. Preferably, the cross-linking agent may be a polyisocyanate selected from the group consisting of hexamethylene diisocyanate, a dimer or trimer thereof, isophorone diisocyanate, a dimer or trimer thereof, pentamethylene diisocyanate, a dimer or trimer thereof, toluene diisocyanate, methylene diphenyl diisocyanate, and mixtures thereof; more preferably a trimer of hexamethylene diisocyanate.

The amount of cross-linking agent in the cross-linkable composition may be adjusted according to the amount of epoxy oligomer of formula (I). In one embodiment, the molar ratio of the total number of hydroxy groups of the epoxy oligomer of formula (I) to the number of isocyanate groups of the cross-linking agent is from 1:0.8 to 1:1.2, preferably from 1:0.9 to 1:1.1, more preferably from 1:0.95 to 1:1.05.

The cross-linkable composition of the invention may further comprise a catalyst. The term "catalyst" is intended to mean a compound that accelerates the formation of urethane bonds between the epoxy oligomer of formula (I) and the cross-linking agent. Preferably, the catalyst may be selected from the group consisting of organic or inorganic acid salts; organometallic salts based on bismuth, lead, tin, antimony, uranium, cadmium, cobalt, thorium, aluminum, mercury, zinc, nickel, cerium, molybdene, vanadium, copper (like for instance copper ethylenediamine/triethylenetetramine complexes), manganese or zirconium; phosphines; tertiary amines; and mixtures thereof; more preferably the catalyst is selected from dibutyltin dilaurate and tertiary amines like for instance 1,8-diazabicyclo [5.4.0] undec-7-ene (DBU), 1,4-diazabicyclo [2.2.2] octane (DABCO), 1,5-diazabicyclo [4.3.0] non-5-ene (DBN) and 4-dimethylaminopyridine (DMAP). The use of hindered tertiary amine (such as DBU) as catalyst is particularly interesting for obtaining a composition with a good pot life/a good shelf life without excessively increasing the drying time for attaining good mechanical properties.

According to one embodiment the cross-linkable composition of the invention may be obtained by a method comprising the following steps:
preparing:
a solution comprising the epoxy oligomer of formula (I) in a solvent and the catalyst;
a solution comprising the opacifying agent and optionally the surfactants;
and a solution comprising the cross-linking agent and mixing said 3 solutions, preferably just before using said composition, only at the time of coating application, in order to improve the shelf life of each component and facilitate transportation.

According to another embodiment the cross-linkable composition of the invention may be obtained by a method comprising the following steps:
preparing:
a solution comprising the epoxy oligomer of formula (I) in a solvent;
a solution comprising the opacifying agent, the catalyst and optionally the surfactant;
and a solution comprising the cross-linking agent and mixing said 3 solutions, preferably just before using said composition in order to improve the shelf life of each component and facilitate transportation.

This latter embodiment is particularly preferred when the catalyst used is a hindered tertiary amine, such as DBU.

The nature and amounts of the constituents of the cross-linkable composition of the invention may be adjusted to provide a composition having a viscosity that is suitable for coating an optical lens. In one embodiment, the cross-linkable composition of the invention exhibits a viscosity of from 0.01 to 0.3 Pa·s, preferably from 0.05 to 0.15 Pa·s. The viscosity of the composition may be measured with a Brookfield viscometer at 60 rpm and 25° C.

The composition of the present invention may be used to obtain a coating as described below.

Coating

The coating of the present invention may be obtained by curing the cross-linkable composition of the invention.

In one embodiment, the coating may be obtained by curing the cross-linkable composition of the invention at a temperature of from 15 to 90° C., preferably 20 to 80° C., more preferably 30 to 40° C. or between 40 and 60° C. for a time of 1 to 8 hours, preferably 2 to 5 hours, more preferably 2 to 3 hours.

The coating of the present invention may comprise a cross-linked network of epoxy oligomer of formula (I) and optionally an opacifying agent dispersed within said cross-linked network. In one embodiment, the coating of the present invention may comprise a network of epoxy oligomer of formula (I) cross-linked with polyisocyanate, in particular a network of epoxy oligomer of formula (I)

comprising polyurethane cross-links. The coating of the present invention may thus be referred to as an epoxy polyurethane coating.

The epoxy oligomer of formula (I), the opacifying agent and the polyisocyanate may be as defined above for the cross-linkable composition.

The coating may be a translucent coloured coating, which allows some light to pass through, or the coating may be an opaque or almost opaque coating, which absorbs at least part of, if not all, of incident light.

The coating of the present invention is particularly well suited to be disposed on a surface of an optical lens, in particular on an edge surface of an optical lens. Indeed, the coating may be used to reduce a reflection caused by a profile of the edge surface. When the coating comprises an opacifying agent and is disposed on the edge surface of an optical lens, it is able to reduce or to prevent myopia rings and white rings for aesthetic purposes. Further, said coating may exhibit high opacity and a good finishing of coloured edge. Advantageously, improvement in aesthetics of the lens can be obtained demonstrated regardless of the type of opacifying agent. A coating material disclosed herein is able to provide high opacity using only a single coat application, which is sufficient to hide myopia rings as well as white rings. Further, overflow of excess coating can be easily removed from an optical lens.

Optical Lens

The present invention also relates to an optical lens comprising a front optical surface, a back optical surface and an edge surface between the front optical surface and the back optical surface, wherein at least one surface of the optical lens is coated with the coating according to the invention.

As used herein, the term "optical lens" refers to any type of lens intended to be supported by a wearer's face, which may be for purposes of improving or enhancing visual acuity, for protecting against the environment, for fashion, or for adornment. The term may refer to ophthalmic lenses, such as non-corrective lenses, semi-finished lens blanks, and corrective lenses, such as progressive addition lenses, unifocal or multifocal lenses. The term may also include one or more of prescription, non-prescription, reflective, anti-reflective, magnifying, polarizing, filtering, anti-scratch, coloured, tinted, clear, anti-fogging, ultraviolet (UV) light protected, or other lenses. Further examples of optical lens include electronic lens, virtual reality (VR) lens, and the like.

An optical lens is generally manufactured in accordance with wearer specifications from an optical lens blank such as a semi-finished lens blank. A semi-finished lens blank generally has two opposite surfaces at least one of which is unfinished. The unfinished surface of the lens blank may be machined according to the wearer's prescription to provide the required surface of the optical lens. An optical lens having finished back and front surfaces may be referred to as an uncut optical lens. In the case of an ophthalmic lens for the correction or improvement of eyesight, for example, the ophthalmic lens may be manufactured according to a wearer prescription corresponding to the visual requirements of that wearer. At least one of the surfaces of the ophthalmic lens may be processed to provide an ophthalmic lens according to the wearer prescription.

The shape and size of the spectacle frame supporting the optical lens may also be taken into account. For example, the contour of the uncut optical lens may be edged according to a shape of a spectacle frame on which the optical lens is to be mounted in order to obtain an edged or cut optical lens.

The optical lens of the invention comprises a front optical surface, a back optical surface and an edge surface between the front optical surface and the back optical surface.

As mentioned above, optical lens may be manufactured in accordance with wearer specifications and which may be processed to provide the optical lens with various functions. Accordingly, optical lens may have a complex structure resulting from interlayering of materials and/or a series of treatments to tailor the optical lens to specific user requirements. For example, the treatments may be carried out to reduce thickness and to render the optical lens lightweight, to improve on transparency, for durability, strength and protection, aesthetics etc. It follows that an optical lens may comprise one or more coatings, other than the coating of the invention, disposed on a surface of a substrate functioning as an optical surface, such as an anti-breakage coating, an anti-scratch coating, an anti-reflection coating, a tint coating, a colour coating, an anti-static coating, or an anti-smudge coating.

Accordingly, the term "optical surface" as used herein refers to a surface of a substrate in the form of a bare optical lens without any coating disposed on the optical surface(s), such as an unfinished or untreated optical lens, as well as a surface of a coating, other than the coating of the invention, which may be designed to be temporarily or permanently disposed on the optical surface(s) of a bare optical lens. Examples of a coating other than the coating of the invention that may be disposed on an optical lens have already been mentioned above, and may further include, but are not limited to, (1) topcoat, (2) anti-reflective (AR) coatings and asymmetrical mirrors, and/or (3) hardcoat (HC).

In one embodiment, the front optical surface and the back optical surface may independently be a substrate, a substrate having a hard coat, or a substrate having a hard multi-coat (HMC) coating, i.e. an antireflective (AR) coating, a hardcoat (HC), and a topcoat disposed thereon. In various embodiments, the front optical surface and the back optical surface may respectively be a concave (Cc) surface and a convex (Cx) surface of the optical lens.

The edge surface corresponds to the surface of the optical lens that is between the front optical surface and the back optical surface. In other words, the edge surface may be disposed in a plane that is relatively perpendicular to the plane of the front and back optical surfaces, i.e. it is generally referred to as the thickness of the optical lens.

The term "edge surface" may also refer to the lateral flank and/or external contour of an optical lens.

Figure 2A:
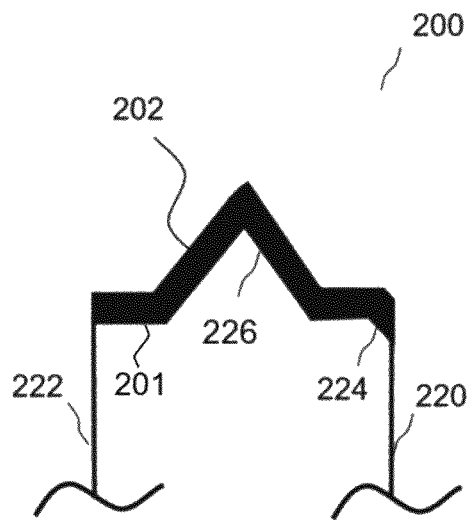
FIG. 2A is a schematic diagram showing an edge coating (202) disposed on an edge surface (201) of an optical lens (200) according to an embodiment. The edge surface (201) of the optical lens (200) is the surface between the front optical surface (220) and the back optical surface (222). The front optical surface (220) and the back optical surface (222) may respectively be a concave (Cc) surface and a convex (Cx) surface. The edge surface (201) of the optical lens (200) comprises a lens bevel (226) and a safety bevel (224). As depicted in the figure, there is no overflow of the edge coating (202) on the front optical surface (220) and the back optical surface (222) of the optical lens (200).
Figure 2B:
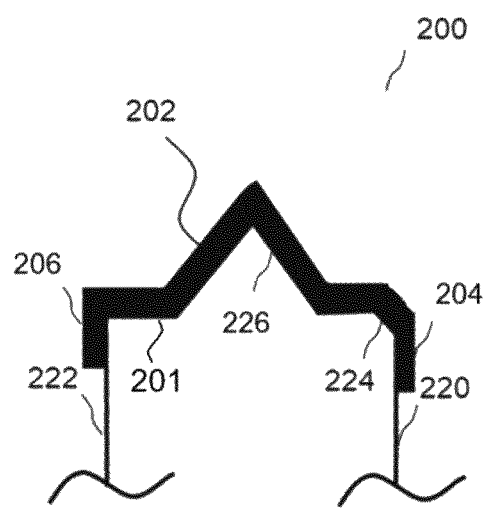
FIG. 2B is a schematic diagram showing an edge coating (202) disposed on an edge surface (201) of an optical lens (200) according to an embodiment. The edge surface (201) of the optical lens (200) is the surface between the front optical surface (220) and the back optical surface (222). The front optical surface (220) and the back optical surface (222) may respectively be a concave (Cc) surface and a convex (Cx) surface. The edge surface (201) of the optical lens (200) comprises a lens bevel (226) and a safety bevel (224). As depicted in the figure, there is overflow of the edge coating (202) in the form of excess coating (204, 206) disposed respectively on the first optical surface (220) and the second optical surface (222) of the optical lens (200).

The edge surface may include a lens bevel and a safety bevel (see, for example, FIG. 2A and FIG. 2B). The term "lens bevel" refers generally to the edge of a lens shaped like a "V", and may help to secure the lens after it has been inserted in an eyewear frame. The term "safety bevel", on the other hand, refers to a flattening bevel ground on the external contour of the optical lens, which may be formed at an interface between the external contour and the front and back optical surfaces of the optical lens, whereby the sharp edges have been removed for a safer lens. The lens bevel and the safety bevel may constitute a profile on the edge surface.

Figure 3A:
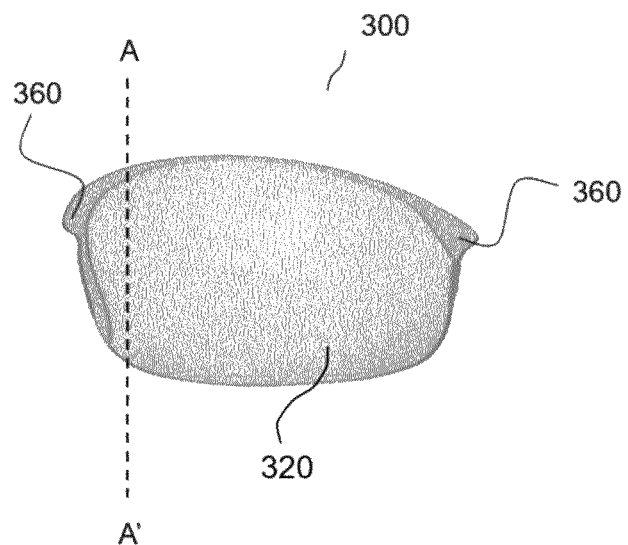
FIG. 3A is a photograph showing an optical lens (300). As depicted in the figure, the profile of the edge surface includes a step-back (360) along a perimeter portion of the front optical surface (320).
Figure 3B:
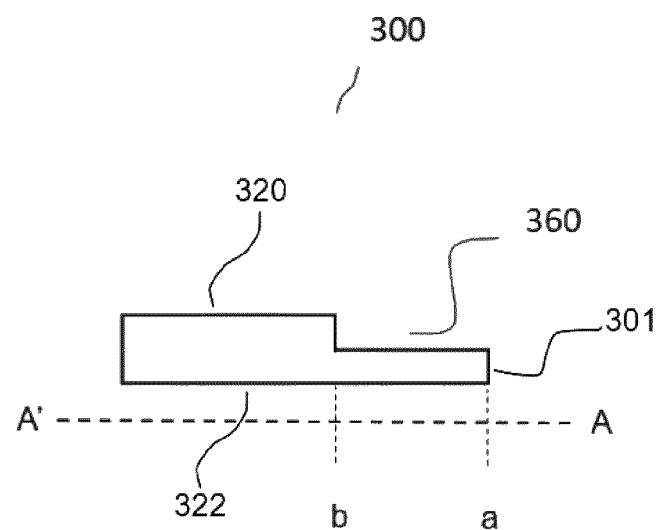
FIG. 3B is a schematic diagram showing a cross-section of the optical lens (300) of FIG. 3A along line A-A'. The optical lens comprises a front optical surface (320), a back optical surface (322) and an edge surface (301). A step-back (360) is shown as an "L" shape with reference to the edge surface (301) and the front optical surface (320) of the optical lens (300).

In some embodiments, the optical lens may further include a step-back on a perimeter portion of one or both of the front optical surface and the back optical surface abutting the edge surface. In such embodiments, the profile on the edge surface may include the step-back along with the lens bevel and the safety bevel. An example of a step-back is shown in FIG. 3A and FIG. 3B. As shown in the figures, the optical lens 300 includes a step-back (360) on an optical surface abutting the edge surface (301), which may be formed by removing a portion of a perimeter portion of the front optical surface (320). Although the step-back (360) in FIG. 3B is shown as a "L" shape with reference to the edge surface (301) and the optical surface of the optical lens (300), it may be of any other shapes such as a "C" shape, a staggered "L" shape, or an irregular shape, for example, with reference to the edge surface (301) and the front optical surface (320) of the optical lens (300). The step-back portion may be used to retain the coating with object of providing a desired coloured contour on the optical lens.

The coating of the present invention is disposed on a surface of the optical lens. Preferably, the coating of the invention may be disposed on an edge surface of the optical lens. The coating disposed on an edge surface of an optical lens is herein referred to as an edge coating.

As mentioned above, the edge surface of the optical lens may be multi-faceted or comprise various shape profiles depending on specific requirements for the finished optical lens. The edge surface of an optical lens may, for example, comprise a lens bevel, a safety bevel, and/or a step-back. The coating of the invention may accordingly be disposed on an entire portion of the edge surface, or on selected portions of the edge surface, such as on one or more facets of a multi-faceted edge surface, the lens bevel, the safety bevel, and/or the step-back. A different coating may be disposed on selected portions of the edge surface. In various embodiments, the coating of the invention may be disposed as one or more layers on the edge of an optical lens. In some embodiments, two or more layers of the coating of the invention may be present, and each of the one or more layers may comprise the same or a different coating.

The coating of the invention may be disposed on the edge surface of an optical lens for various reasons. For example, the coating may form a coating effective to reduce a reflection caused by a profile of the edge surface. As mentioned above, a coating comprising an opacifying agent disposed on the edge surface of an optical lens may reduce or prevent myopia rings and white rings for aesthetic purposes.

Myopia rings may be caused by total internal reflection when light travels from the lens edge to the air gap between the lens and the frame, and may be generated due to reflection of light from one or both of the optical surfaces and/or the edge surface. This is particularly true at the lens edges, which, oftentimes, have been shaped in order to be fitted into the frame. White rings, on the other hand, may be caused by a thickness of the optical lens, and may be observed visually from the front of the lens. By reducing or eliminating a reflection caused by a profile of the edge surface, visibility of the myopia rings or white rings otherwise appearing along the perimeter of the optical lens face may be reduced or eliminated.

The reduction or elimination of reflection of light from one or both of the optical surfaces and/or the edge surface may be carried out, for example, by one or more of (i) absorbing incident light on the interface of an optical lens and an edge coating; (ii) increasing the transmittance of incident light on the interface of an optical lens and an edge coating; or (iii) increasing roughness of one or both of the optical surfaces and/or the edge surface.

Without being bound by theory, it is presumed that the reduction of myopia rings on an optical lens may be obtained by controlling the refractive index of the coating disposed on the optical lens. In one embodiment, the coating, in particular the edge coating, has a refractive index $n_1$ and the optical lens has a refractive index $n_2$, and $n_1$ and $n_2$ are such that:

a) $n_1$ is greater than or equal to $n_2$, or
b) $n_1$ is less than $n_2$, and $(n_2-n_1)$ is 0.4 or less, preferably 0.3 or less, more preferably 0.2 or less, even more preferably 0.1 or less, more preferably still 0.05 or less.

By varying the refractive indices of the coating and/or the underlying optical lens so as to meet the above conditions, light behavior through the lens may be altered to reduce visibility of myopia rings.

The term "refractive index" is intended to mean the absolute refractive index of a material, which may be expressed as the ratio of the speed of electromagnetic radiation in free space, such as vacuum, to the speed of the electromagnetic radiation in that material. Refractive index may be measured using known methods using, for example, an Abbe refractometer in the visible light region. The refractive index of the coating is preferably measured on a coating devoid of any opacifying agent.

In one embodiment, the refractive index of the coating and the refractive index of the optical lens are such that refractive index of the coating $n_1$ is the same or substantially similar to the refractive index of the optical lens $n_2$. By disposing a coating on an edge surface of the optical lens, any light passing through the optical lens is able to travel from the optical lens to the edge coating with minimal refraction and/or reflection, since the two refractive indices are the same or similar. In other words, any abrupt change in refractive index which would have been present at the interface between the edge of the optical lens and the air is now levelled by the coating, since any light passing through the optical lens does not encounter a substantial difference in refractive index between the optical lens and the coating. This translates into reduced visibility of myopia rings.

In another embodiment, the refractive index of the coating $n_1$ and the refractive index of the optical lens $n_2$ are such that refractive index of the coating $n_1$ is greater than the refractive index of the optical lens $n_2$. If the refractive index of the coating is higher than that of the lens, light may be able to pass from the lower index medium (lens) to higher index medium (edge coating) by regular refraction of light without experiencing total internal reflection. In this case, myopia rings may not be observed either.

In yet another embodiment, the refractive index of the coating $n_1$ and the refractive index of the optical lens $n_2$ are such that refractive index of the coating $n_1$ is less than the refractive index of the optical lens $n_2$, and difference between the refractive index of the optical lens and the refractive index of the coating is 0.4 or less, such as 0.3 or less, 0.2 or less, 0.1 or less, or 0.05 or less. The smaller the difference in refractive index between the coating and the lens, the lower the propensity for total internal reflection to occur due to an increased critical angle, which translates into increased attenuation of myopia rings by the coating.

Since the refractive index of the coating $n_1$ and the refractive index of the optical lens $n_2$ are expressed relative to each other, it follows that the respective refractive indices are determined under the same or similar conditions such as wavelength of incident light, in establishing the various relationships between $n_1$ and $n_2$ mentioned herein.

In one embodiment, the refractive index of the coating of the invention, in particular the edge coating, may be in the range from about 1.49 to less than about 2. For example, the refractive index of the coating may be in the range of about 1.49 to about 1.99, such as about 1.5 to about 1.99, about 1.52 to about 1.99, about 1.54 to about 1.99, about 1.55 to about 1.99, about 1.49 to about 1.9, about 1.49 to about 1.8, about 1.49 to about 1.7, about 1.49 to about 1.6, about 1.5 to about 1.85, about 1.52 to about 1.75, or about 1.55 to about 1.7. The refractive index of the coating may be measured on a coating having a thickness of 10 to 200 micrometers.

The refractive index of the optical lens, on the other hand, may be in the range from about 1.4 to about 1.9, such as about 1.5 to about 1.9, about 1.6 to about 1.9, about 1.7 to about 1.9, about 1.8 to about 1.9, about 1.4 to about 1.8, about 1.4 to about 1.7, about 1.4 to about 1.6, about 1.45 to about 1.85, about 1.45 to about 1.75, or about 1.5 to about 1.7.

The optical lens of the invention may comprise a substrate made of a material selected from the group consisting of allyl diglycol carbonate (CR39), polycarbonate (PC), poly(methyl methacrylate) (acrylic), a urethane-based material such as Trivex®, a thiourethane-based material such as MR-7® or MR-8®, episulfide, glass, and mixtures thereof.

Allyl diglycol carbonate (CR39), polycarbonate (PC), acrylic, Trivex® and MR-8® are generally considered to have a relatively low refractive index whereas MR-7®, episulfide (such as MR-1.74®, based on episulfide monomers) and glass are generally considered to have a relatively high refractive index.

In one embodiment, the coating disposed on a surface, in particular on an edge surface, of the optical lens of the invention may have one or more of:
  a) a transmittance of less than 5%, preferably from 0.01 to 1%;
  b) an adhesion strength in the range of about 1 N/mm2 to about 5 N/mm2;
  c) a pencil hardness in the range of about 1 H to about 4 H.
  d) water or soap water or alcohol resistance.

In particular, the coating of the invention may have a transmittance of less than 5%, such as less than 4%, less than 3%, less than 2%, less than 1%, or a transmittance in the range of 1% to 5%, 2% to 5%, or 3% to 5%. The term "transmittance" as used herein refers to intensity of radiation transmitted through a material over that of the incident radiation, and which is expressed as a percentage. As mentioned above, when the coating comprises an opacifying agent, the coating may be opaque or almost opaque and able to absorb at least part of, if not all, of the light arriving from the lens, so as to result in further attenuation of the light. The transmittance may be measured across the visible light region of the electromagnetic spectrum, corresponding to a wavelength range of about 350 nm to about 750 nm.

In one embodiment, the coating of the invention may have an adhesion strength in the range of about 1 N/mm2 to about 5 N/mm2. A coating having an adhesion strength that is too low may not be able to remain adhered on the surface of the optical lens upon further processing, for example, when mounting the optical lens onto a frame or when removing overflow from the optical surface(s). This may result in chipping of the coating. On the other hand, when adhesion strength of the coating is too high, it may be difficult to remove any overflow from the optical surface(s) of the optical lens. To this end, the present inventors have found that an adhesion strength in the range of about 1 N/mm2 to about 5 N/mm2 provides optimal balance of adhesive properties to allow adhering to the surface, while still rendering it possible to easily remove any overflow from the optical surface(s) of the optical lens.

In one embodiment, the coating of the invention has a pencil hardness in the range of about 1 H to about 4 H. As used herein, the term "pencil hardness" refers to a hardness value which is measured according to American Society of Testing Material ASTM D-3363, and may be a measure of the resistance of the coating to superficial scratches. A coating having a pencil hardness that is too low may result in scratching of the coating during processing, for example, when mounting the optical lens onto a frame. On the other hand, a coating having a pencil hardness that is too high may result in a coating that is too brittle. The inventors have found that a pencil hardness in the range of about 1 H to about 4 H provides a good balance of durability of the coating and processability of the coating during processing.

In particular, the coating of the invention may exhibit water resistance or soap water resistance. The term "water resistance" or "soap water resistance" means that the coating exhibits a weight change of less than 2%, in particular less than 1%, after sonication in an ultrasonic talk comprising water or soap water, i.e. water containing 1% by weight of commercial hand-wash detergent, for a time of 3-5 min, at a temperature of 25° C. The alcohol resistance of the coating is due to the high degree of cross-linking of the coating.

In particular, the coating of the invention may exhibit alcohol resistance. The term "alcohol resistance" means that the coating is not affected by gentle rubbing with a cloth drenched with an alcohol, such as isopropyl alcohol. The alcohol resistance of the coating may be assessed visually, for example by noting no or minimal coloration on the cloth with which the coating was rubbed.

In addition to the above-mentioned, the coating may function as (a) a lubricating material effective to ease mounting of the optical lens onto an eyeglass frame, and/or (b) a shock absorbing material effective to reduce stress concentrations on an edge portion of the optical lens.

For functioning as a lubricating material effective to ease mounting of the optical lens onto an eyeglass frame, the coating may further comprise a lubricating substance, such as a lubricating fluid, for example, a synthetic oil or a lubricity enhancing polyfluoropolyether fluid, and/or a lubricating grease. The lubricating substance may be dispersed in the coating material, or be applied as a layer on the edge coating formed by the coating material.

Also, the coating may function as a shock absorbing material effective to reduce or prevent stress concentrations on an edge portion of the optical lens. For functioning as a shock absorbing material, the coating material may further comprise a shock absorbing substance such as carbon black, iron oxide and/or a metallic oxide. As carbon black, which may be used as an opacifying agent, is also able to function as a shock absorbing substance, in embodiments wherein the opacifying agent is carbon black, the coating may already be able to function as a shock absorbing material without further addition of a shock absorbing substance.

The optical lens of the invention may be obtained by:
  preparing the cross-linkable composition of the invention;
  coating a surface of the optical lens with said cross-linkable composition; and
  cross-linking said cross-linkable composition to form a coating on said surface of the optical lens.

The methods of preparing the cross-linkable composition, the coating and the optical lens of the invention are detailed below.

Method of Preparing a Coating

The coating of the invention may be prepared according to a method comprising the following steps:
  a) providing a solution comprising the epoxy oligomer of formula (I) in a solvent;
  b) adding an opacifying agent, a cross-linking agent, and a catalyst to the solution, wherein the cross-linking agent is added after the opacifying agent is added to the solution; and c) cross-linking the epoxy oligomer with the cross-linking agent to form a cross-linked network, wherein the opacifying agent is dispersed in the cross-linked network.

The epoxy oligomer of formula (I), the solvent, the opacifying agent, the cross-linking agent, and the catalyst used in the method of the invention may be as defined above for the cross-linkable composition.

The solution of epoxy oligomer of formula (I) may be obtained by a method comprising the following steps:
  a) providing a solution of an epoxy monomer of formula (IV) in a solvent

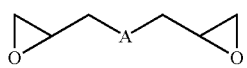
(IV)

wherein A is as defined above;
  b) reacting the epoxy monomer of formula (IV) with an amino alcohol of formula (V) to provide a hydroxylated amino monomer of formula (VI)

$$H_2N-X-OH \quad (V)$$

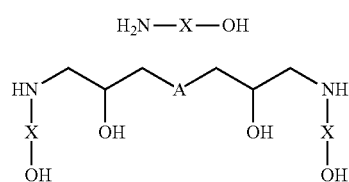
(VI)

wherein X is as defined above;
  c) reacting the hydroxylated amino monomer of formula (VI) with the epoxy monomer of formula (IV) to provide the epoxy oligomer of formula (I), wherein n is 2;
  d) optionally repeating the reaction with an amino alcohol of formula (V) and the reaction with the epoxy monomer of formula (IV) until the epoxy oligomer of formula (I) reaches a value for n of 3, 4, 5 or 6.

In one embodiment, the opacifying agent is provided in the form of a dispersion of the opacifying agent in a solvent, wherein said dispersion comprises 5 to 75%, preferably 20 to 60%, more preferably 30 to 50%, by weight of the opacifying agent based on the weight of the dispersion. In particular, the solvent of the dispersion of the opacifying agent may be the same as a solvent in the solution of epoxy oligomer of formula (I) of step a). More particularly, the solvent of the dispersion of the opacifying agent may be propylene glycol monomethyl ether acetate. The dispersion of the opacifying agent may further comprise a surfactant or a mixture of surfactants. Indeed, the surfactant may help to ensure homogenous dispersion of the opacifying agent. An example of a suitable surfactant is Tego® Dispers 670 marketed by Evonik. Another example of a suitable surfactant is EFKA® FL 3778 marketed by BASF (an acrylic copolymer). This surfactant EFKA® FL 3778 (optionally mixed with Tego® Dispers 670) can advantageously be used for ensuring even coating on polycarbonate (PC) substrate.

The cross-linking agent is added after the opacifying agent is added to the solution. Indeed, this order of addition allows the opacifying agent to be dispersed more homogenously in the solution before cross-linking takes place. Order of addition of the catalyst, on the other hand, is not particularly important and it may be added with the solution of the epoxy oligomer of formula (I) (the resin) and/or the opacifying agent and/or the cross-linking agent. However the catalysts are preferably added with the solution of the epoxy oligomer of formula (I) and/or the opacifying agent. Furthermore, in the case of hindered tertiary amines like DBU, they are advantageously added with the opacifying agent. Such order of addition avoids affecting the shelf life of the solution of the epoxy oligomer of formula (I). Use of tertiary amines like DBU catalyst also enables to increase the pot life of the cross-linkable composition, compared to the composition with for instance organic acid salts, like dibutyltin dilaurate.

The conditions of the cross-linking step may be as defined above for the coating, namely heating at a temperature of from 15 to 90° C., preferably 20 to 80° C., more preferably 30 to 40° C., or between 40 to 60° C. for a time of 1 to 8 hours, preferably 2 to 5 hours, more preferably 2 to 3 hours.

Method of Preparing an Optical Lens

The optical lens of the invention may be obtained by coating a surface of an optical lens according to a method comprising the following steps:
  a) applying the cross-linkable composition of the invention to a surface of an optical lens, preferably an edge surface of an optical lens; and
  b) curing the cross-linkable composition.

In one embodiment, the cross-linkable composition may be applied to a surface of the optical lens using a method selected from the group consisting of vacuum deposition, vapor deposition, sol-gel deposition, spin coating, dip coating, spray coating, flow coating, film laminating, sticker coating, roller coating, brush coating, painting, sputtering, casting, Langmuir-Blodgett deposition, laser printing, inkjet printing, screen printing, pad printing, and a combination thereof. Air blowing during applying the cross-linkable composition to the surface of the optical lens can help to evaporate solvent quickly, reducing myopia rings.

The cross-linkable composition may be applied to a surface of the optical lens as a single coat or as a double coat. Advantageously when the optical lens comprises a substrate made of polycarbonate (PC), the cross-linkable composition is applied as a double coat. In one embodiment, the thickness of the layer of the coating after curing may be from 10 to 200 micrometers, preferably 50 to 100 micrometers.

The curing of the cross-linkable composition may be as described above for the coating. Thus the cross-linkable composition may be cured for instance at a temperature of 50° C. for a time of 3 hours.

When the optical lens comprises a substrate made of polycarbonate (PC) and the cross-linkable composition is applied as a double coat, the first layer of the cross-linkable composition is for instance cured at around 50° C. for a time of 10 minutes to 1 hour and the second layer of the cross-linkable composition is for instance cured at around 50° C. for a time of 2 to 5 hours, typically for a time of 3 hours.

According to one embodiment of the present invention, in particular for optical lens comprising a substrate made of polycarbonate (PC) or made of episulfide (with a refractive index of 1.74, such as MR-1.74®, based on episulfide monomers), the surface to be coated of said optical lens is advantageously pretreated before the application of the cross-linkable composition of the present invention.

Acetone, propylene glycol monomethyl ether acetate (MPA), isopropanol (IPA), tetrahydrofurane (THF) or a mixture thereof can be used for such pretreatment.

Silane compounds, amine compounds or thiol compounds can also be used for such pretreatment. Such compounds can be used in dispersion, solution in a solvent (such as water, isopropanol etc). Furthermore such compounds can be used in combination with surfactants (for instance fluorosurfactants (such as FC 4434 sold by 3M) or silicone surfactant (such as BYK 310 sold by BYK).

In a particular embodiment of the present invention, the surface of the optical lens is pretreated by acetone, propylene glycol monomethyl ether acetate (MPA), isopropanol (IPA), tetrahydrofurane (THF), silane compounds, amine compounds, thiol compounds or a mixture thereof, before applying the cross-linkable composition.

In the case of optical lens comprising a substrate made of polycarbonate (PC) or made of episulfide (with a refractive index of 1.74, such as MR-1.74® based on episulfide monomers), the surface to be coated of said optical lens is preferably pretreated before the application of the cross-linkable composition of the present invention with silane compounds, amine compounds or thiol compounds.

Examples of suitable silane compounds include aminopropyl triethoxysilane, aminotrimethoxysilane.

Examples of suitable amine compounds include diethylene triamine, para-phenyldiamine.

4,4'-Thiodiphenol is one example of suitable thiol compound.

In the case of optical lens comprising a substrate made of polycarbonate (PC) the surface to be coated of said optical lens is advantageously pretreated with an aqueous solution of para-phenyldiamine.

In the case of optical lens comprising a substrate made of episulfide (with a refractive index of 1.74, such as MR-1.74®, based on episulfide monomers) the surface to be coated of said optical lens is advantageously pretreated with a 4,4'-Thiodiphenol solution in isopropanol.

After this pretreatment, the optical lens is preferably dried, heated before applying the cross-linkable composition. For example the optical lens can be heated at a temperature of from 25 to 60° C. (typically at 50° C.) for a time of 10 to 60 minutes, more particularly for a time of 10 to 30 minutes (typically for 15 minutes).

This invention will be further illustrated by the following non-limiting examples which are given for illustrative purposes only and should not restrict the scope of the appended claims.

EXAMPLES

In the examples, the following ingredients are used:
NPEL-128: Bisphenol A diglycidyl ether epoxy resin marketed by Nan Ya Plastics (epoxy monomer of formula (IV))
NPEL-127: Bisphenol F diglycidyl ether epoxy resin marketed by Nan Ya Plastics (epoxy monomer of formula (IV))
EPONEX® resin 1510: Hydrogenated Bisphenol A diglycidyl ether epoxy resin marketed by HEXION (epoxy monomer of formula (IV))
MPA: Propylene glycol monomethyl ether acetate marketed by Sigma-Aldrich (solvent)
THF: Tetrahydrofuran marketed by Sigma-Aldrich (solvent)
Ethanolamine: marketed by Sigma-Aldrich (amino alcohol of formula (V))
R-400R: Carbon black marketed by Cabot (opacifying agent)
HDT-LV2: Hexamethylene isocyanate trimer marketed by Vencorex (cross-linking agent)
DBTDL: Dibutyltin dilaurate marketed by Sigma-Aldrich (catalyst)
DBU: 1,8-diazabicyclo [5.4.0] undec-7-ene marketed by Sigma-Aldrich (catalyst)
TD 670: Tego® Dispers 670 marketed by Evonik (surfactant)
EFKA® FL 3778: an acrylic copolymer marketed by BASF (surfactant)
para-phenyldiamine marketed by Sigma-Aldrich (for pretreatment surface of the optical lens)
4-4'thiodiphenol marketed by Sigma-Aldrich (for pretreatment surface of the optical lens)
BYK®-310: Silicone-containing surface additive, a solution of a polyester-modified polydimethylsiloxane marketed by BYK (for pretreatment surface of the optical lens)
BYK®-340: polymeric fluoro surfactant marketed by BYK (for pretreatment surface of the optical lens)

Example 1: Preparation of a Solution of Epoxy Oligomer

The amount of each ingredient (in % by weight based on the weight of the solution of epoxy oligomer) used to prepare the solution of epoxy oligomer is listed in the following table:

| Ingredient | Sample 1 Amount (wt %) | Sample 2 Amount (wt %) | Sample 3 Amount (wt %) |
|---|---|---|---|
| NPEL-128 | 40-45 | | 12-18 |
| NPEL-127 | | 40-45 | |
| EPONEX ® Resin 1510 | | | 20-32 |
| MPA | 15-30 | 15-30 | 15-30 |
| Ethanolamine | 4.40-5.20 | 4.4-5.20 | 4.2-5.2 |
| THF | 25-35 | 25-35 | 26-36 |
| Total | 100 | 100 | 100 |

The solution of epoxy oligomer of Samples 1-3 was obtained with the following steps:

Sample 1
1. 6.50 g of NPEL-128 and 9.00 g of MPA were added in a reactor and stirred for 10-15 mins to make a solution.
2. 1.98 g of ethanolamine was added into the solution and stirred continuously for 20-24 hours.
3. The reaction mixture was heated at 40° C. for 3-4 hours.
4. The reaction mixture was cooled down to room temperature (20-25° C.). 12.88 g of THF were added and the mixture was stirred for 0.5 to 1 hour.
5. 11.50 g of NPEL-128 were added into the reaction mixture and stirred well. Stirring was continued for another 20-24 hrs.
6. The solution was heated at 40° C. for 3-4 hrs to obtain a clear or slightly yellowish solution of epoxy oligomer referred to as Sample 1.

Sample 2
1. 6.30 g of NPEL-127 and 9.00 g of MPA were added in a reactor and stirred for 10-15 mins to make a solution.
2. 1.98 g of ethanolamine was added into the solution and stirred continuously for 20-24 hours.
3. The reaction mixture was heated at 40° C. for 3-4 hours.
4. The reaction mixture was cooled down to room temperature (20-25° C.). 12.88 g of THF were added and the mixture was stirred for 0.5 to 1 hour.

5. 11.60 g of NPEL-127 were added into the reaction mixture and stirred well. Stirring was continued for another 20-24 hrs.
6. The solution was heated at 40° C. for 3-4 hrs to obtain a clear or slightly yellowish solution of epoxy oligomer referred to as Sample 2.

Sample 3
1. 6.50 g of NPEL-128 and 9.00 g of MPA were added in a reactor and stirred for 10-15 mins to make a solution.
2. 1.98 g of ethanolamine was added into the solution and stirred continuously for 20-24 hours.
3. The reaction mixture was heated at 40° C. for 3-4 hours.
4. The reaction mixture was cooled down to room temperature (20-25° C.). 12.88 g of THF were added and the mixture was stirred for 0.5 to 1 hour.
5. 11.00 g of EPONEX Resin 1510 were added into the reaction mixture and stirred well. Stirring was continued for another 20-24 hrs.
6. The solution was heated at 40° C. for 3-4 hrs to obtain a clear or slightly yellowish solution of epoxy oligomer referred to as Sample 3.

Example 2: Preparation of Cross-Linkable Compositions with an Epoxy Oligomer (According to the Invention)

The amount of each ingredient (in % by weight based on the weight of the composition) used to prepare the cross-linkable composition of the invention is listed in the following table:

| Part | Ingredient | Formula 1 Amount (wt %) | Formula 2 Amount (wt %) | Formula 3 Amount (wt %) | Formula 4 Amount (wt %) |
|---|---|---|---|---|---|
| Part A (resin) | Sample 1 (epoxy oligomer according to example 1) | 22.73 | 19.92 | — | — |
| | Sample 2 (epoxy oligomer according to example 1) | — | — | 21.23 | — |
| | Sample 3 (epoxy oligomer according to example 1) | — | — | — | 23.73 |
| | THF | 4.72 | 4.5 | 4.92 | 4.62 |
| | DBTDL (as 4 wt % solution in MPA) | 1.57 | 1.56 | 1.57 | 1.57 |
| Part B (black ink) | R-400R (as a 43 wt % dispersion in MPA) | 44.10 | 46.20 | 45.10 | 44.50 |
| Part C (hardener) | MPA | 17.29 | 19.32 | 18.23 | 15.19 |
| | HDT-LV2 | 9.59 | 8.50 | 8.95 | 10.39 |

The cross-linkable compositions of Formulae 1-4 were obtained with the following steps:

Part A
Part A was obtained with the following steps
1. The epoxy oligomer solution and THF were added in a reactor and stirred for 10-15 mins to make a solution.
2. DBTDL (as a 4 wt % solution in MPA) was weighed and added into the above solution and stirred continuously for 5-10 mins.

Part B
Part B was obtained by mixing the amount of R-400R and MPA to form a dispersion of carbon black.

Part C
Part C was obtained by mixing HDT-LV and MPA in a reactor and stirring for 10-15 mins to make a solution.

Cross-Linkable Composition
The cross-linkable composition was obtained with the following steps:
1. Part A and Part B were weighed and mixed together in a reactor & stirred for 20-30 mins.
2. Part C was weighed and added into the Part A and Part B mixture and stirred continuously for 5-10 mins.

Example 3: Preparation of a Cross-Linkable Composition with a Polyol Devoid of Epoxide Groups (Comparative)

The amount of each ingredient (in % by weight based on the weight of the composition) used to prepare the comparative cross-linkable composition is listed in the following table:

| Ingredient | Amount (wt %) |
|---|---|
| polycaprolactone-based polyol (PCL) | 9 |
| HDT-LV2 | 5 |
| DBTDL | 1 |
| Acetone | 40 |
| MPA | 15 |
| Black ink | 30 |
| Total | 100 |

The preparation of the comparative cross-linkable composition includes the following steps: PCL was dissolved in acetone and MPA, then ink and catalyst (DBTDL) were added to the mixture to obtain Part A. HDT-LV2 (Part B) was added into Part A.

Example 4: Preparation of Coating on an Optical Lens

The cross-linkable composition of the invention obtained according to Formula 1 in example 2 or the comparative cross-linkable composition obtained according to example 3 were applied to the surface of an optical lens (1.6 or 1.67 substrate) by brush coating, or roller coating, or spray coating, or flow coating, or dipping methods so as to cover the entire edge surface.

The cross-linkable composition of the invention was cured by heating at 40° C. for 3 hours. The comparative cross-linkable composition was cured by heating at 25° C. for 8 hours.

The optical lens exhibited the following characteristics:

| | Coating | | | |
|---|---|---|---|---|
| | Cross-linked epoxy oligomer according to the invention based on Formula 1 | | Comparative cross-linked polyurethane | |
| Substrate | 1.6 | 1.67 | 1.6 | 1.67 |
| Myopia ring coverage | 5 | 5 | 3 | 3 |
| Colour edge finishing | 5 | 5 | 3 | 3 |
| Drying time (hrs) | 3 | 3 | 8 | 8 |
| Water leaching | No | No | Minimal | Minimal |
| Isopropyl alcohol leaching | No | No | Yes | Yes |

Myopia Ring Coverage Evaluation:

Criteria: Observation of intensity of myopia ring was made and graded accordingly on a scale from Grade 1 to Grade 5. Rating of Grade 5 was given if no myopia rings were observed, and Grade 1 was given if obvious myopia rings were observed.

Figure 4:
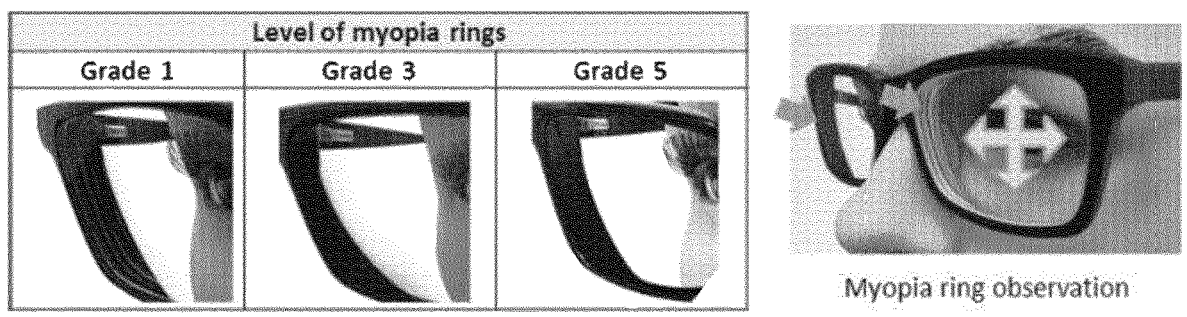
FIG. 4 are photographs depicting performance comparison of myopia ring masking by an edge coating on a scale of 1 to 5 (5 corresponding to total masking of myopia ring).

Methodology: Myopia rings were observed visually from the front of the lenses. Observations were carried out at an angle of about 45 degrees to the plane of the optical surface at 4 different areas (left, right, top, bottom) of the optical lens after the lenses were mounted (refer to FIG. 4). Normal ambient light was used for the inspection.

Colour Edge Finishing

Criteria: Observation of visibility and regularity of white/grey patches not covered by coating, and whether coverage on Cc and Cx surfaces is 0%. Level of grading was characterized from Grade 1 to 5, with rating of Grade 5 given for the best level of finishing.

Figure 5:
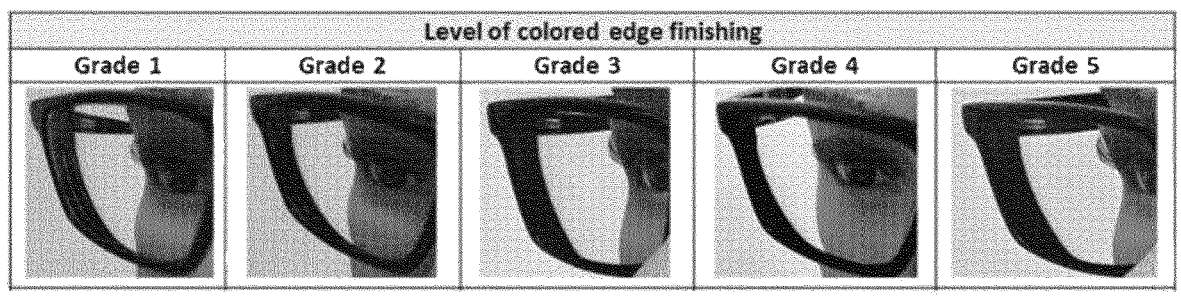
FIG. 5 are photographs depicting performance comparison of coloured edge finishing of edge coatings. A rating of Grade 1 was given to a coating having grey/white irregular patches of regions visible on 50% or more of the edge surface. A rating of Grade 2 was given to a coating having grey/white irregular patches of regions visible on 30% or more of the edge surface as shown in the figure. A rating of Grade 3 was given to a coating having small regions of non-homogeneous grey areas which may not be regular. A rating of Grade 4 was given to a coating having perfectly black coverage except for two faint and regular grey/white lines. A rating of Grade 5 was given to a coating having total coverage of the edge surface giving a perfectly black area.

Methodology: Edges were observed visually from the front of the lenses. Observations were carried out at an angle of about 45 degrees with respect to plane of the optical surface, in 4 different areas (left, right, top, bottom) after mounting of lenses (refer to FIG. 5). Normal ambient light was used for the inspection.

Drying Time Evaluation

The drying time of the coating was assessed by determined by two main factors:

(1) ability to remove overflown coating on the front and back optical surfaces without damaging the edge of the coating; and/or
(2) attaining sufficient adhesion and hardness to the coating which does not chip-off while mounting on the frame.

Water Leaching Test

Lens with frames was immersed into water at 25° C. and ultra-sonicated for 3 minutes cycle. The lens and frames were dried and their weight compared to the weight prior to immersion.

Isopropyl Alcohol Leaching Test

Lens was gently rubbed with a white cloth drenched with isopropyl alcohol. The alcohol resistance of the coating was assessed visually, for example by noting no or minimal coloration on the cloth with which the coating was rubbed.

Conclusion

The coating obtained with the cross-linkable composition of the invention dries faster and exhibits better myopia ring coverage, water-resistance and isopropyl alcohol resistance than the coating obtained with the comparative cross-linkable composition.

Further, the cross-linkable composition of the invention can be used to coat a polycarbonate substrate whereas the comparative cross-linkable composition cannot (presence of acetone).

Example 5: Preparation of Cross-Linkable Compositions with an Epoxy Oligomer (According to the Invention)

The amount of each ingredient (in % by weight based on the weight of the composition) used to prepare the cross-linkable composition of the invention is listed in the following table:

| Part | Ingredient | Formula 5 Amount (wt %) | Formula 6 Amount (wt %) |
|---|---|---|---|
| Part A (resin) | Sample 1 (epoxy oligomer according to example 1) | 20.89 | 20.93 |
| | THF | 5.78 | 5.79 |
| Part B (black ink) | R-400R (as a 43 wt % dispersion in MPA) | 41.87 | 41.95 |
| | DBU | 0.2 | |
| | MPA | 13.13 | 13.15 |
| | EFKA FL 3778 | 2.67 | 2.67 |
| Part C (hardener) | MPA | 5.16 | 5.17 |
| | HDT-LV2 | 10.3 | 10.34 |

The procedure for preparing the cross-linkable compositions of Formulae 5 and 6 is identical to that described in Example (for Formulae 1 to 4).

The pot life of formula 1 (example 1) is 30 minutes whereas the pot life of formula 5 and 6 is respectively around 4 hours and between 8 to 12 hours.

3 other formulae according to the invention were prepared (Formulae 7 to 9) using a different procedure.

Whereas the 3 parts of formulae 1 to 4 were mixed at once before coating, the new proposal for formulae 7 to 9 is to formulate part A, part B, and part C separately for longer shelf life and easy transportation. The 3 parts are then mixed only at the time of coating application.

The amount of each ingredient (in % by weight based on the weight of the composition) used to prepare the cross-linkable composition of the invention (formulae 7 to 9) is listed in the following table:

| Part | Ingredient | Formula 7 Amount (wt %) | Formula 8 Amount (wt %) | Formula 9 Amount (wt %) |
|---|---|---|---|---|
| Part A (resin) | Sample 1 (epoxy oligomer according to example 1) | 78.33 | 78.33 | 78.33 |
| | THF | 16.26 | 21.67 | 21.67 |
| | DBTDL (as 4 wt % solution in MPA) | 5.42 | | |
| | Total Part A | 100 | 100 | 100 |
| Part B (black ink) | MPA | 43.2 | 53.94 | 54.13 |
| | R-400R | 43 | 31.09 | 31.20 |
| | TD ® 670 | 13.8 | 9.98 | 10.02 |
| | DBU | | 0.34 | |
| | EFKA FL 3778 | | 4.65 | 4.65 |
| | Total Part B | 100 | 100 | 100 |
| Part C (hardener) | MPA | 64.33 | 33.33 | 33.33 |
| | HDT-LV2 | 35.67 | 66.67 | 66.67 |
| | Total Part C | 100 | 100 | 100 |
| Mixing Ratio | Part A | 1 | 1 | 1 |
| | Part B | 1.52 | 2.15 | 2.15 |
| | Part C | 0.93 | 0.58 | 0.58 |
| Viscosity of coating after mixing | | 80-100 cps at 60 rpm | | |
| Solid content of coating after mixing | | 40.5-46% | 41-46% | 41-46% |
| Shelf life of each components (before mixing) | | Around 6 months | | |
| Pot life of the cross-linkable composition (after mixing) | | 30 min | Around 4 hours | Around 1 week |

| Part | Ingredient | Formula 7 Amount (wt %) | Formula 8 Amount (wt %) | Formula 9 Amount (wt %) |
|---|---|---|---|---|
| | Drying/curing time at 25° C. (after coating application) | Around 6 hours | Around 8 hours | Around 48 hours |
| | Drying/curing time at 40° C. (after coating application) | 3 to 4 hours | 3 to 4 hours | 8 to 12 hours |
| | Drying/curing time at 50° C. (after coating application) | 2 to 3 hours | 2 to 3 hours | Around 8 hours |

The cross-linkable compositions of Formulae 7-9 were obtained with the following steps:

Part A

Part A was obtained with the following steps
1. The epoxy oligomer solution and THF were added in a reactor and stirred for 10-15 mins to make a solution.
2. For formula 7, DBTDL (as a 4 wt % solution in MPA) was weighed and added into the above solution and stirred continuously for 5-10 mins.

Part B

Part B was obtained with the following steps
1. The amount of R-400R and MPA and surfactant were stirred for 15 to 60 mins to form a dispersion of carbon black.

For formula 6 the amount of DBU was added to the above dispersion and stirred continuously for 4 to 24 hours.

Part C

Part C was obtained by mixing HDT-LV and MPA in a reactor and stirring for 10-15 mins to make a solution.

Cross-Linkable Composition

The cross-linkable composition was obtained with the following steps:
1. Part A and Part B were weighed and mixed together in a reactor & stirred for 20-60 mins.
2. Part C was weighed and added into the Part A and Part B mixture and stirred continuously for 5-20 mins.

Example 6: Preparation of Coating on an Optical Lens

The cross-linkable composition of the invention obtained according to Formula 8 in example 4 was applied to the surface of an optical lens (PC substrate or 1.74 substrate (MR-1.74®, based on episulfide monomers)) either manually or automation (by brush coating, or roller coating, or spray coating, or flow coating, or dipping methods) so as to cover the entire edge surface.

For the Optical Lens Made of 1.74:

The surface of the optical lens to be coated was pretreated with a solution in IPA of 10% thiodiphenol+0.3% BYK®-310 surfactant (in % by weight based on the weight of the solution). The lens was dried at 50° C. for 15 minutes. After resting the lens at room temperature for 10-15 minutes the cross-linkable composition was applied. During the coating a stream of air was applied towards the lens edge surface. The cross-linkable composition was then dried, cured at 50° C. for 3 hours.

For the Optical Lens Made of PC:

The surface of the optical lens to be coated was pretreated with an aqueous solution of 2% para-phenyldiamine and 1% BYK®-340 surfactant (in % by weight based on the weight of the solution) by contacting the edge surface carefully with clothe wetted with the aqueous solution of para-phenyldiamine in 3 cycles. The lens was dried at 50° C. for 15 minutes. After resting the lens at room temperature for 10-15 minutes a first layer of the cross-linkable composition was applied. This was dried at 50° C. for 15-50 minutes. Then a second layer of the cross-linkable composition was applied. The coating was then dried at 50° C. for 3 hours. During the coating a stream of air was applied towards the lens edge surface.

The optical lenses exhibited the following characteristics:

The methods for assessment are the same as the one disclosed above in Example 4.

| Substrate | Coating Cross-linked epoxy oligomer according to the invention based on Formula 8 | |
|---|---|---|
| | PC | 1.74 |
| Myopia ring coverage | Pass 3 | Pass 3 |
| Colour edge finishing | Pass 3 or 4 | Pass 3 or 4 |
| Drying time (hrs) | 3 | 3 |
| Water leaching | Pass | Pass |

We have found grade 3 for myopia ring coverage evaluation is very acceptable by wearer and thus we have set grade 3 or higher as: "Pass". Anything below 3 fails.

The same applies to Color edge finishing: Grade 3 and above are "Pass". Lower than 3 fails.

The invention claimed is:

1. A cross-linkable composition comprising an epoxy oligomer of formula (I):

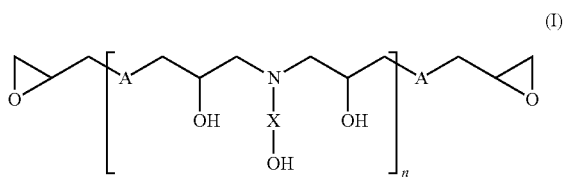

(I)

wherein
  A is a residue of a diol;
  X is a substituted or unsubstituted hydrocarbylene; and
  n is 2, 3, 4, 5 or 6;
and an opacifying agent.

2. The cross-linkable composition of claim 1, wherein the diol comprises a bisphenol moiety.

3. The cross-linkable composition of claim 1, wherein X is an unsubstituted $C_1$-$C_{10}$ hydrocarbylene.

4. The cross-linkable composition of claim 1, wherein n is 2.

5. The cross-linkable composition according to claim 1, wherein A is represented by formula (II) or (III):

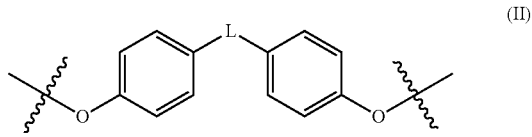

(II)

-continued

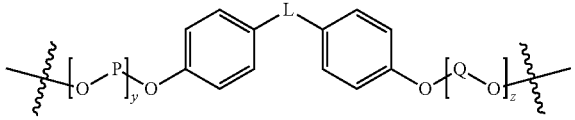
(III)

wherein:
L is a direct bond, —CR$^1$R$^2$—, —O—, —NR$^3$—, —S(O)$_{0-2}$—, —C(O)—, or L is selected from

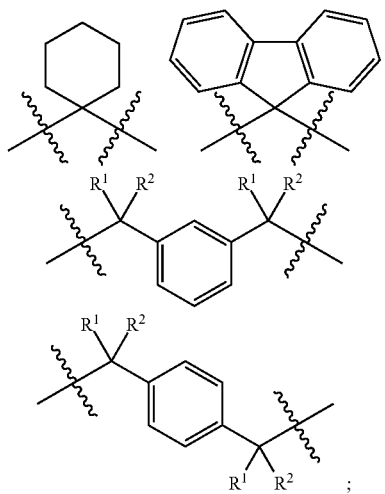

P and Q are each independently ethylene or propylene;
R$^1$ and R$^2$ are each independently H, halogen, C$_1$-C$_{10}$ alkyl, C$_1$-C$_{10}$ haloalkyl, aryl, aralkyl or —NR$^3$R$^4$;
R$^3$ and R$^4$ are each independently H or C$_1$-C$_{10}$ alkyl; and
y and z are each independently an integer of 1 to 40.

6. The cross-linkable composition according to claim 5, wherein A is represented by formula (IIa) or (IIIa):

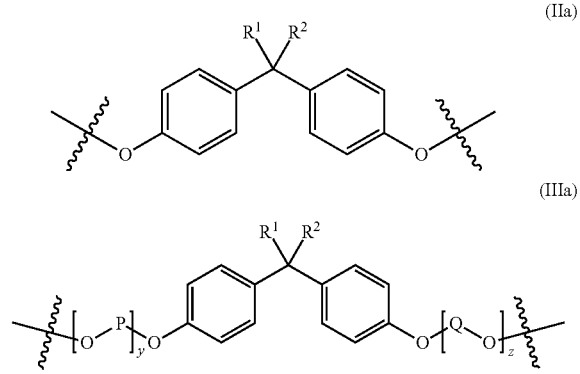

wherein R$^1$ and R$^2$ are each independently H, halogen, C$_1$-C$_{10}$ alkyl.

7. The cross-linkable composition according to claim 1, wherein X is a substituted or unsubstituted alkylene.

8. The cross-linkable composition according to claim 1, wherein the weight ratio of the epoxy oligomer of formula (I) to the opacifying agent is in the range of about 1:0.1 to about 1:3.

9. The cross-linkable composition according to claim 1, wherein the composition further comprises a solvent or a mixture of solvents.

10. The cross-linkable composition according to claim 1, wherein the composition further comprises a cross-linking agent having at least two isocyanate groups.

11. The cross-linkable composition according to claim 1, wherein the composition further comprises a catalyst.

12. A coating comprising a cross-linked network of the epoxy oligomer of formula (I) as defined in claim 1 and an opacifying agent.

13. The coating of claim 12, wherein the opacifying agent is dispersed within said cross-linked network.

14. An optical lens comprising a front optical surface, a back optical surface and an edge surface between the front optical surface and the back optical surface, wherein at least one surface of the optical lens is coated with the coating according to claim 12.

15. The optical lens of claim 14, wherein the coating has a refractive index n$_1$ and the optical lens has a refractive index n$_2$, and wherein:
n$_1$ is greater than or equal to n$_2$, or
n$_1$ is less than n$_2$, and (n$_2$−n$_1$) is 0.4 or less.

16. A method of preparing a coating for an optical lens, said method comprising:
providing a solution comprising the epoxy oligomer of formula (I) as defined in claim 1 and an opacifying agent in a solvent;
adding a cross-linking agent and a catalyst to the solution; and
cross-linking the epoxy oligomer with the cross-linking agent to form a cross-linked network, wherein the opacifying agent is dispersed in the cross-linked network.

17. A method of coating a surface of an optical lens, said method comprising:
applying the cross-linkable composition as defined in claim 1 to a surface of an optical lens; and
curing the cross-linkable composition.

18. The method of claim 17, wherein the cross-linkable composition is applied to an edge surface of the optical lens.

* * * * *